United States Patent [19]

De Rooij et al.

[11] 3,862,230

[45] Jan. 21, 1975

[54] CONTINUOUS PREPARATION OF CYCLOHEXANONE OXIME

[75] Inventors: Abraham H. De Rooij, Geleen; Jan Elmendorp, Brunssum, both of Netherlands

[73] Assignee: Stamicarbon N.V., Heerlen, Netherlands

[22] Filed: Dec. 7, 1973

[21] Appl. No.: 422,712

Related U.S. Application Data

[63] Continuation of Ser. No. 73,906, Sept. 21, 1970, abandoned.

[30] Foreign Application Priority Data
Sept. 20, 1969  Netherlands.................... 6914308

[52] U.S. Cl............................................. 260/566 A
[51] Int. Cl......................................... C07c 131/04
[58] Field of Search............................. 260/566 A

[56] References Cited
FOREIGN PATENTS OR APPLICATIONS
1,138,750  0/1969  Great Britain................ 260/566 A

*Primary Examiner*—Bernard Helfin
*Assistant Examiner*—Gerald A. Schwartz
*Attorney, Agent, or Firm*—Cushman, Darby & Cushman

[57] ABSTRACT

A process for the continuous preparation of an oxime from cyclohexanone and an aqueous buffered solution of a hydroxylammonium salt together with free phosphoric acid, phosphates, nitrates, and optionally sulphates all in controlled amounts and without the use of an organic solvent is disclosed. The resulting aqueous reaction mixture contains a manageable amount of unreacted cyclohexanone which is subsequently recovered and recirculated.

1 Claim, No Drawings

CONTINUOUS PREPARATION OF CYCLOHEXANONE OXIME

This is a continuation, of application Ser. No. 73,906 filed Sept. 21, 1970, now abandoned.

BACKGROUND OF THE INVENTION

This invention relates to an improved process for the continuous preparation of cyclohexanone oxime, in which cyclohexanone is reacted with a counter-current of a buffered aqueous solution of hydroxylammonium salt derived from a relatively weak acid, such as phosphoric acid, ammonium hydrogen sulphate or an alkali hydrogen sulphate.

It has already been proposed in British Pat. No. 1,138,750 to carry out such a process in the presence of a non-water-miscible or poorly water-miscible organic solvent for cyclohexanone and the cyclohexanone oxime product, which, together with the cyclohexanone, flows in counter-current to the aqueous solution of the hydroxylammonium salt on the one hand, a pure solution of the oxime in the solvent is then obtained, and on the other hand only a small amount of cyclohexanone remains dissolved in the solution leaving the reactor, which is virtually exhausted in hydroxylammonium salt. In this manner the hydroxylammonium salt is efficiently used. A further advantage of the organic solvent process is its flexibility with respect to the temperature conditions; operational temperatures below the solidification point of the oxime formed are not objectionable, the possibility of solid matter being deposited and clogging the equipment is obviated since the oxime is kept in solution in the organic solvent.

Moreover, in the absence of an organic solvent there is a risk of cyclohexanone and the cyclohexanone oxime thus formed being attacked by the acid reaction medium, which becomes increasingly acidic as additional hydroxylammonium salt is consumed. When the process is practiced using an organic solvent, attack is possible only at the interface between the organic solvent and the more or less acidic aqueous solution containing the hydroxylammonium salt, thereby the risk of attack by the acid reaction medium is considerably reduced.

However, attendant with the above advantages is the disadvantage of the cost of separation of the oxime from the solvent by distillation. If no organic solvent were used in the continuous preparation of the oxime, this cost of distillation could admittedly be saved, but only at the expense of the other above-mentioned advantages. Also, the additional cost of stripping the unreacted cyclohexanone from the aqueous solution virtually exhausted in hydroxylammonium salt that has remained behind is a consideration when an organic solvent is not used.

DESCRIPTION OF THE INVENTION

It has now been found that a cyclohexanone oxime of sufficient purity, comparable to that produced using an organic solvent, can also be obtained in a continuous process without the use of an organic solvent when the process is carried out such that the contact time between the aqueous solution containing the hydroxylammonium salt and the cyclohexanone flowing in counter-current does not exceed a total contact time of 6 minutes. Indeed, the process of the present invention is even more economical than a similar process using an organic solvent provided that the composition of the aqueous solution starting material containing the hydroxylammonium salt is selected such that no more than 0.9 ton of cyclohexanone per ton of cyclohexanone oxime produced remains dissolved in the effluent solution and need be recovered therefrom.

The time of contact between the aqueous solution containing hydroxylammonium salt whether or not other dissolved substances are present and the cyclohexanone is actually the residence time in minutes in the reaction zone R which is equal to the reaction volume V divided by the sum of the feeds to the synthesis zone or reactor $\Sigma f$ of the aqueous solution containing hydroxylammonium salt and the cyclohexanone, measured in parts by volume per unit time. This relationship is represented by the equation:

$$R = V/\Sigma f$$

With a longer contact time than 6 minutes, the risk of attack by the acid reaction medium attended by formation of unwanted by-product increases. Notwithstanding the above, with a longer contact time of for example 30 minutes, an oxime of reasonable quality can still be obtained. However, in that case it should be taken into account that the cost of purifying the caprolactam, the ultimate product obtained from the rearrangement of the cyclohexanone oxime, may increase. Thus operation using a contact time in excess of about 6 minutes does not affect the principles of the invention but generally will only add to the cost of the process.

The quantity of cyclohexanone to be recovered from the reaction mixture per kg of oxime produced depends only in part on the solubility of the cyclohexanone in the effluent aqueous solution exhausted in hydroxylammonium salt. Another factor which plays a role in the quantity of cyclohexanone recovered is the composition of the starting solution containing hydroxylammonium salt. More particularly, the concentration of hydroxylammonium salt and the concentration of other components dissolved in the starting hydroxylammonium salt solution affect the quantity of cyclohexanone, in tons per ton of oxime produced, remaining behind in the aqueous solution exhausted in hydroxylammonium salt. Therefore, the higher the concentration of dissolved substances in the original solution containing hydroxylammonium salt, the smaller the quantity of cyclohexanone to be recovered will be.

In the known process, as discussed in U.S. Pat. No. 3,514,254, the disclosure of which is hereby incorporated by reference, of preparing a hydroxylammonium salt solution by catalytic reduction of nitrate ions in a reaction medium buffered with phosphate phosphoric acid, the hydroxylammonium dihydrogen phosphate solution produced always contains the primary alkali and/or ammonium salts of phosphoric acid and ammonium nitrate in addition to free phosphoric acid.

In order to maintain the activity of the catalyst in the reduction reaction, it is desirable, on the one hand, to use a minimum nitrate content of 0.7 mole per kilogram of solution. However, on the other hand, this content cannot be increased indefinitely, since a high concentration of nitrate in the reaction solution will affect the solubility of the other components. Therefore, in practice the concentration of ammonium salts will not exceed 4 moles per kg of solution. Since the preparation of hydroxylamine by catalytic reduction of nitrate ions with phosphate and phosphoric acid in a buffered solution is generally carried out at a pH of 1.3 – 2.0, measured with a pH meter, at a temperature of about 20° to 90 °C, the ratio between phosphate and phosphoric acid is in practice within certain limits, for instance, of about 2 to 3, so that only the concentrations of dissolved phosphate and phosphoric acid can be varied.

It has now been found possible to meet the condition that the quantity of cyclohexanone remaining behind in and to be recovered from the effluent aqueous solution of the oxime synthesis should not exceed 0.9 per kg of oxime produced, by maintaining the concentration of hydroxylammonium salt and the concentration of dissolved phosphate and phosphoric acid present in the starting solution above certain values. Moreover, the presence of other salts, particularly sulphates, has been found to have a very favorable effect, in that these salts considerably reduce the quantity of cyclohexanone to be recovered. For, it has been discovered that, if the starting solution is a hydroxylammonium salt solution which, in addition to the hydroxylammonium dihydrogen phosphate and at least 0.7 mole/kg of nitrate, contains free phosphoric acid and alkali or ammonium salts of phosphoric acid, and, if desired, the corresponding salts of sulphuric acid, and if the solution has a pH, measured with a pH meter of 1.3 to 2.0, the quantity of cyclohexanone remaining behind in the effluent exhausted aqueous solution can be kept from exceeding 0.9 kg of oxime. This maximum desired cyclohexanone content will be controlled provided that care is taken that the hydroxylammonium salt content of the starting solution is equal to or higher than 0.5 mole/kg solution, and that the sum of the concentrations of dissolved phosphoric acid, phosphates, and sulphates, if present (which sum will hereinafter be written as $\Sigma PO_4$ and $\Sigma PO_4 + SO_4$, respectively), does not exceed 1 mole/kg of solution.

The higher the concentration of the hydroxylammonium salt and the higher the concentration of $\Sigma PO_4$ or $\Sigma PO_4 + {}_{SO4}$ in the starting solution, the smaller the quantity of cyclohexanone to be recovered from he effluent solution exhausted in hydroxylammonium salt. Of course it is desirable to maintain the quantity of unreacted cyclohexanone as low as possible in order to increase efficiency of the reaction and decrease cyclohexanone recovery costs.

For instance, the quantity of cyclohexanone to be recovered per kg of oxime produced is less than 0.5 kg if the hydroxylammonium salt content of the starting solution is about 0.7 mole/kg and $\Sigma PO_4 = 2.0$ moles/kg. Particularly advantageous is the presence of dissolved sulphate in the starting solution. In the presence of, for instance, 1.75 moles of sulphate/kg of solution in addition to 1 mole of [$PO_4$] /kg, at a hydroxylammonium salt content of 0.66 mole/kg, the quantity of cyclohexanone to be recovered is 0.09 kg per kg of oxime produced. The use of a favorable ratio of $SO_4$ to $PO_4$ in the synthesis of the hydroxylammonium salt is described in copending application Ser. No. 73,905 filed Sept. 21, 1970, the disclosure of which is hereby incorporated by reference.

The oxime production according to the present invention can be carried out in normal counter-current reactors, such as packed columns, sieve-plate, or so-called "rotating-disc" reactors, in which the organic phase, the cyclohexanone, and the aqueous solution containing the hyroxylamine are in contact with each other in fine dispersion. If required, an even finer dispersion can be obtained by pulsating the liquid streams. Pressure within the reaction zone varies with the reactor used; however, while pressures with the range of about 1 to 20 atm. are particularly effective, higher pressures may be used.

The oxime synthesis reaction can also be conveniently carried out in a number of reactors, for example three to six reactors arranged in series and equipped with stirrers, each reactor being provided with a liquid/liquid separator, and the cyclohexanone being continuously fed to one end and the aqueous hydroxylammonium salt solution continuously supplied to the other end of the battery of reactors.

One embodiment of the invention is shown schematically in the accompanying drawing. According to this embodiment, the oxime preparation is carried out in a counter-current reactor A, the top and bottom ends of which are widened to function as liquid/liquid separators. The organic phase, that is the cyclohexanone, is fed to the bottom of the reactor through a pipe 1, the heavier water phase is fed to the top of the column through a pipe 2.

In the top of column A the oxime formed separates from the water phase. A sufficiently high temperature is maintained here of about 80° to 120 °C which is above the solidification point of the watercontaining oxime in order to keep the oxime in the molten condition. An operational pH of about 0.3 to 1.0 is maintained. The oxime phase, which still contains about 1 to 2 percent by weight of non-converted cyclohexanone, is fed, through a pipe 3, to a secondary stirred reactor B, to which are fed also a small amount of solution containing hydroxylammonium salt, through a pipe 22, and an alkaline reagent, preferably ammonia, through a pipe 4, in such a quantity that the pH in the secondary reactor is maintained at a value of approximately 4.5.

From the secondary reactor B the reaction mixture flows, through a pipe 5, to the liquid/liquid separator C, where the molten oxime produced is separated from the water phase and carried off through a pipe 6. This oxime can be rearranged to caprolactam as disclosed, for example, in U.S. Pat. No. 2,769,000 after having been washed with water to remove impurities if necessary.

The water phase discharged from the bottom of separator C is fed to the top of column A through a pipe 7. In the base of column A a water phase virtually exhausted in hydroxylammonium salt is collected, in which, for example, 1–6 percent by weight of cyclohexanone has remained behind. This water phase is fed, through a pipe 8, to the top of a stripping column D, where the cyclohexanone dissolved in the water phase is stripped off by heating, for example with steam supplied through a pipe 9. The top product, a cyclohexanone-water azeotrope, is condensed in a condenser E. The condensate flows into a separator F, from which the top layer of cyclohexanone is fed back to the reactor A through a pipe 10; the cyclohexanone-free water phase is discharged from the bottom of the stripping column D through a pipe 11.

Said water phase may be recirculated from pipe 11 to a hydroxylammonium salt synthesis zone (not shown), to serve as reaction medium therein, in which case the hydroxylamine thus formed reacts with the acid present in the water phase previously removed from the hydroxylammonium salt to form the hydroxylammonium salt, whereupon the hydroxylammonium salt solution thus obtained is recirculated to the oxime synthesis reactor A through pipe 2. A suitable process for preparing a solution containing hydroxylammonium salt is described in U.S. Pat. No. 3,514,254, the disclosure of which is hereby incorporated by reference.

The process according to the invention will be elucidated by means of the following working examples. In these examples, the starting solutions containing hydroxylammonium salt differ one from the other in composition, in that different compositions of make-up solution are supplied to a hydroxylammonium salt synthesis zone. In the following examples the solution containing the hydroxylammonium salt is prepared according to the process disclosed in U.S. Pat. No. 3,514,254.

The data given in these examples and the results obtained have been listed in the following table.

order not to work precisely on this border line, the $\Sigma PO_4$ content will have to be higher than 1, as is illustrated by examples 7 and 13 in comparison with example 1.

Excellent results are obtained if a large quantity of salt is present in solution. In that case, the content of cyclohexanone remaining behind, and hence the quantity of cyclohexanone to be recovered, is greatly reduced, as will be confirmed by comparing examples 26 and 29 with example 13.

We claim:

1. A process for the continuous preparation of cyclohexanone oxime which comprises:
   a. reacting in the absence of an organic solvent cyclohexanone in an oxime synthesis zone with a counter-current of a buffered aqueous solution containing hydroxylamine having a pH of about 1.3 – 2.0 and comprising:

| | Composition of the feed to the hydroxylamine synthesis, moles | | | | | | Hydroxylammonium salt solution obtained (Process stream 2) | | | Cyclohexanone content of exhausted aqueous solution, % by weight | Cyclohexanone to be recuperated, kg per kg of oxime |
|---|---|---|---|---|---|---|---|---|---|---|---|
| Example | $H_3PO_4$ | $HNO_3$ | $NH_4NO_3$ | $H_2SO_4$ | $(NH_4)_2SO_4$ | $H_2O$ | $NH_3OH^+$, moles /kg | $PO_4$, moles /kg | $PO_4+SO_4$, moles /kg | Process stream 8 | Process stream 10 |
| 1 | 100 | 80 | 100 | — | — | 4,250 | 0.68 | 1.0 | 1.0 | 6.2 | 0.81 |
| 2 | 125 | 60 | 145 | — | — | 5,400 | 0.545 | 1.0 | 1.0 | 5.6 | 0.91 |
| 3 | 150 | 40 | 190 | — | — | 6,500 | 0.455 | 1.0 | 1.0 | 5.2 | 1.01 |
| 4 | 175 | 20 | 235 | — | — | 7,670 | 0.39 | 1.0 | 1.0 | 4.9 | 1.11 |
| 5 | 200 | — | 280 | — | — | 8,850 | 0.34 | 1.0 | 1.0 | 4.6 | 1.21 |
| 6 | 100 | 80 | 80 | — | — | 3,230 | 0.85 | 1.25 | 1.25 | 6.0 | 0.63 |
| 7 | 125 | 60 | 120 | — | — | 4,100 | 0.68 | 1.25 | 1.25 | 5.5 | 0.72 |
| 8 | 150 | 40 | 160 | — | — | 4,970 | 0.565 | 1.25 | 1.25 | 4.9 | 0.77 |
| 9 | 175 | 20 | 200 | — | — | 5,835 | 0.485 | 1.25 | 1.25 | 4.5 | 0.82 |
| 10 | 200 | — | 240 | — | — | 6,700 | 0.425 | 1.25 | 1.25 | 4.2 | 0.87 |
| 11 | 100 | 80 | 67 | — | — | 2,550 | 1.02 | 1.5 | 1.5 | 5.9 | 0.51 |
| 12 | 125 | 60 | 103 | — | — | 3,250 | 0.815 | 1.5 | 1.5 | 5.0 | 0.54 |
| 13 | 150 | 40 | 140 | — | — | 3,950 | 0.68 | 1.5 | 1.5 | 4.4 | 0.57 |
| 14 | 175 | 20 | 177 | — | — | 4,650 | 0.58 | 1.5 | 1.5 | 4.0 | 0.61 |
| 15 | 200 | — | 213 | — | — | 5,350 | 0.51 | 1.5 | 1.5 | 3.8 | 0.66 |
| 16 | 100 | 80 | 50 | — | — | 1,710 | 1.36 | 2.0 | 2.0 | 5.8 | 0.38 |
| 17 | 125 | 60 | 83 | — | — | 2.200 | 1.09 | 2.0 | 2.0 | 4.6 | 0.37 |
| 18 | 150 | 40 | 115 | — | — | 2,680 | 0.905 | 2.0 | 2.0 | 3.9 | 0.38 |
| 19 | 175 | 20 | 148 | — | — | 3,160 | 0.775 | 2.0 | 2.0 | 3.4 | 0.39 |
| 20 | 200 | — | 180 | — | — | 3,640 | 0.68 | 2.0 | 2.0 | 3.1 | 0.40 |
| 21 | 100 | 80 | 40 | — | — | 1,200 | 1.70 | 2.5 | 2.5 | 5.7 | 0.30 |
| 22 | 125 | 60 | 70 | — | — | 1,560 | 1.36 | 2.5 | 2.5 | 4.3 | 0.28 |
| 23 | 150 | 40 | 100 | — | — | 1,910 | 1.18 | 2.5 | 2.5 | 3.4 | 0.26 |
| 24 | 175 | 20 | 130 | — | — | 2,260 | 0.97 | 2.5 | 2.5 | 2.9 | 0.26 |
| 25 | 200 | — | 160 | — | — | 2,620 | 0.85 | 2.5 | 2.5 | 2.6 | 0.27 |
| 26 | 100 | — | 200 | 44 | 130 | 3,000 | 0.665 | 1.0 | 2.75 | 0.3 | 0.09 |
| 27 | 125 | — | 275 | 37.5 | 37.5 | 3,000 | 0.70 | 1.25 | 2.0 | 1.9 | 0.31 |
| 38 | 125 | — | 295 | 37.5 | 112.5 | 3,000 | 0.625 | 1.25 | 2.75 | 1.1 | 0.20 |
| 29 | 200 | — | 200 | — | 75 | 3,000 | 0.68 | 1.0 | 1.75 | 1.3 | 0.20 |
| 30 | 125 | — | 135 | 30 | 10 | 1,500 | 1.24 | 2.4 | 3.0 | 1.59 | 0.11 |

From the foregoing examples it is apparent that if the solutions containing hydroxylammonium salt are free of sulphate and have a hydroxylammonium salt content below 0.5 mole, the quantity of non-converted cyclohexanone to be recovered exceeds the value of 0.9 kg per kg of oxime produced (see examples 3, 4 and 5), and as a consequence the process, while operable, can no longer compete with the oxime preparation using a non-water-miscible or poorly water-miscible organic solvent.

Border-line cases in which the quantity of unreacted cyclohexanone is near the 0.9 kg limit are those examples (examples 1 and 2) in which, although the hydroxylammonium salt content is higher than 0.5 mole/kg, the concentration of $\Sigma PO_4$ is just equal to unity. In hydroxylammonium dihydrogen phosphate present in an amount at least equal to about 0.5 mole per kilogram of said solution, ammonium nitrate, nitric acid or mixtures thereof present in an amount of at least about 0.7 moles per kilogram of said solution, phosphoric acid and a compound selected from the class consisting of alkali salts of phosphoric acid, ammonium salts of phosphoric acid and mixtures thereof, the total concentration of phosphoric acid and said salt when dissolved is at least equal to about 1 mole per kilogram of said solution, and a member selected from the class consisting of alkali salts of sulphuric acid, ammonium salts of sulphuric acid and mixtures thereof; the contact time being the residence time of the respective fluids in the oxime synthesis zone as expressed by the general equation:

$$R = V/\Sigma f$$

wherein R is the residence time in the synthesis zone in minutes, V is the reaction volume, and $\Sigma f$ is the sum of the feeds to the synthesis zone measured in parts by volume per unit of time, and R does not exceed 6;

b. separating the oxime from the reaction mixture; and c. discharging from said oxime synthesis zone a solution virtually exhausted in hydroxylamine and containing not more than about 0.9 kg of unreacted cyclohexanone per kg. of oxime produced.

* * * * *